No. 722,065. PATENTED MAR. 3, 1903.
V. WEILER.
ANIMAL TRAP.
APPLICATION FILED MAY 27, 1902.
NO MODEL. 2 SHEETS—SHEET 2.
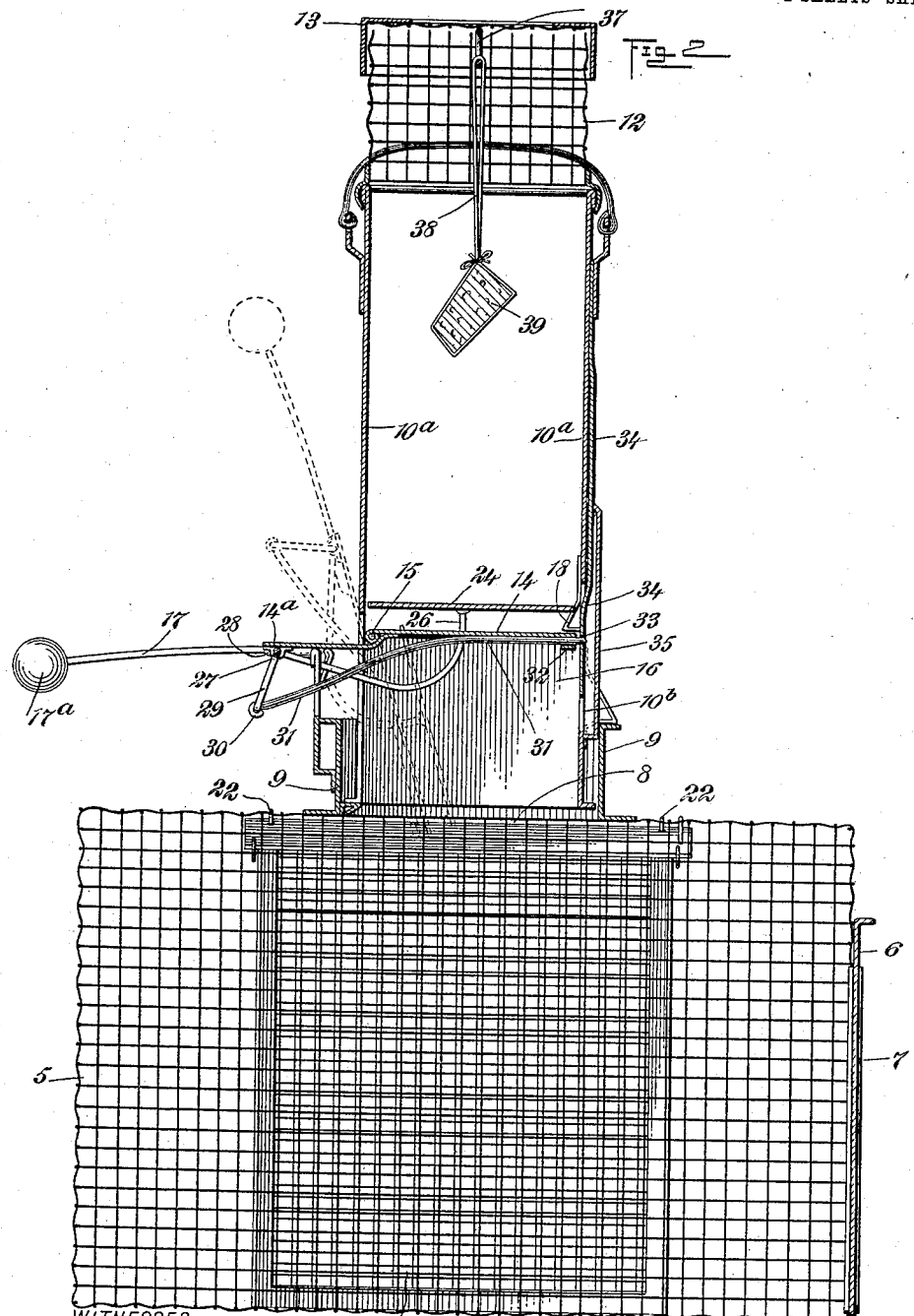
WITNESSES: INVENTOR
Valentine Weiler
BY
ATTORNEYS.

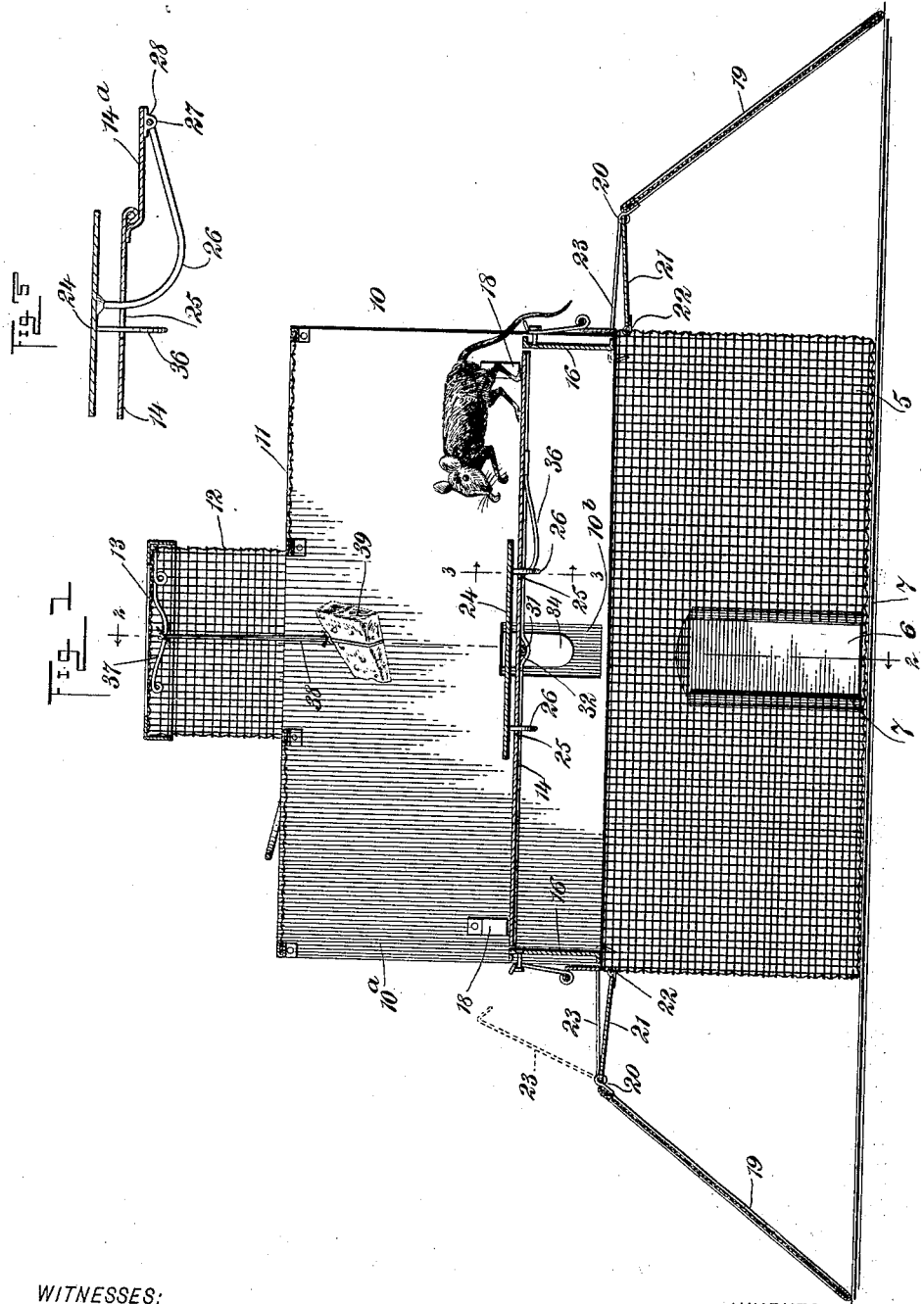

UNITED STATES PATENT OFFICE.

VALENTINE WEILER, OF LINCOLN, NEBRASKA.

ANIMAL-TRAP.

SPECIFICATION forming part of Letters Patent No. 722,065, dated March 3, 1903.

Application filed May 27, 1902. Serial No. 109,166. (No model.)

*To all whom it may concern:*

Be it known that I, VALENTINE WEILER, a citizen of the United States, and a resident of Lincoln, in the county of Lancaster and State of Nebraska, have invented new and useful Improvements in Animal-Traps, of which the following is a full, clear, and exact description.

My invention relates to improvements in animal-traps especially adapted for catching small animals, such as rats and mice; and one object that I have in view is the provision of an improved structure into which the animals may be enticed easily by the bait, which is so arranged that it cannot be reached by the animals from the outside of the trap.

A further object that I have in view is the provision of a sensitive tripping mechanism which may be operated by the imposition of the slightest weight on a movable member, thus increasing the quickness and certainty of operation, and this tripping mechanism is so related to the bait-holder that the animal in its efforts to reach the bait must step on or engage with the movable member, thereby springing the trap and causing the animal to be dropped into the cage. The tripping devices form the runway for the animals and serve to close the subjacent cage, and they include automatic locking and setting parts.

With these ends in view the invention consists of the combination, construction, and arrangement of parts, which will be hereinafter fully described and claimed.

Reference is to be had to the accompanying drawings, forming a part of this specification, in which similar characters of reference indicate corresponding parts in all the figures.

Figure 1 is a vertical longitudinal section through an animal-trap constructed in accordance with my invention. Fig. 2 is a vertical sectional view in the plane of the dotted line 2 2 of Fig. 1, and Fig. 3 is a transverse detail section on the line 3 3 of Fig. 1.

The cage 5 may be constructed of any desired or approved material, and it constitutes the lower member or section of the improved trap, as shown by the drawings. This cage is constructed of wire of suitable mesh and strength; but sheet metal or other materials may be employed. Said cage is provided on one side with a door 6, that is slidably fitted in guides 7, and in the top part of the cage is a longitudinal central slot or opening 8. (See Fig. 2.) Parallel bearing-strips 9 are secured to the top of the cage on an opposite side of the longitudinal slot 8, and these bearing-strips extend upwardly from the cage and also run longitudinally thereof.

10 designates an upper section or member of the trap, which is removably supported on or within the bearing-rails 9, and this upper section is quite narrow as compared with the width of the trap, although the length of the top section is equal to the length of the cage or bottom section 5. The upper section consists of parallel side plates 10$^a$ and a covering 11 of wire fabric, the whole being united together in any secure way, thereby providing the bottomless member or section, which is open at both ends, as shown by Fig. 1. This upper section is equipped with a central dome 12, having a removable head 13, and, as shown, these parts are constructed of wire fabric, although any other suitable material may be adopted.

The upper section or member 10 of the trap is provided with a main platform 14, which is provided at one edge with a longitudinal rod 15, that is loosely supported at its ends in the plates 16, which are provided at the end portions of the upper member and are attached to the parallel metallic side plates 10$^a$. The platform is thus pivotally supportd within the trap-section 10 so as to turn on a horizontal axis and drop to the inclined position shown by dotted lines in Fig. 2, and this platform is normally held in a raised position by means of a counterweighted arm 17, the latter being secured to an extended edge portion 14$^a$ of the platform and provided at its free end with a weight 17$^a$. The platform is adapted to be arrested in its upward movement by the stops 18, which are secured to the inner face of one side or plate 10, so as to lie in the path of the free edge of the pivoted platform, whereby the stops arrest the upward movement of the platform when it is returned from its downwardly-inclined position to a horizontal position by the inertia of the weight 17$^a$.

The platform 14 is held by the counterweights and stops which lie substantially flush with the top edges of the end plates 16, and the animals can obtain access easily to this platform by means of the inclined runways 19, the latter being disposed at the end portions of the trap and inclining upwardly thereto. These runways are preferably hinged or pivoted, as at 20, to the plates 21, having pivotal connection at 22 with the upper end portions of the trap and the runways and held in position by means of the hooked rods 23, adapted to engage with the cage 5. By disengaging the hooks the runways and their plates may be folded upwardly against the open end portions of the member or section 10, after which the hooked rods should be again engaged with the member 5 in order to hold the parts in position convenient for storage or transportation.

24 designates a drop-plate which is disposed immediately below the bait and is arranged to control the latch device in a manner to secure the sensitiveness in the operation of the trap. This drop-plate is of quite small size as compared with the platform 14, and it is arranged to normally lie a short distance above said platform. The platform is provided with slots 25, through which are adapted to play the curved carrying-arm 26, the latter being firmly secured to the under side of the drop-plate and having their outer ends attached to a rock-shaft 27, the latter being journaled in suitable bearings 28, which are provided on the extended edge 14ª of the platform. (See Figs. 2 and 3.) The rock-shaft is also provided with a depending crank-arm 29, to which is loosely connected, as at 30, the outer end of a latch-rod 31, the same having its free end arranged to play in a keeper 32, which is attached to the platform 14. (See Figs. 1 and 2.) The end of this latch-rod, which is controlled by the cranked rock-shaft having operative connection with the drop-plate 24, is adapted to fit into the eye or perforation 33 of a latch-spring 34, the latter being secured to one of the plates 10ª and having its free perforated end arranged to operate in a slot 10ᵇ. The lower part of the latch-spring is housed or confined in a keeper 35, which is secured to the inside of one of the plates 10ª and is arranged to inclose the lower perforated end of the spring. It will be seen that the drop-plate 24 is mounted upon the platform to have a limited movement with respect thereto, and this plate is kept in its raised position by means of a light tension-spring 36, which is secured to the under side of the platform and to the corresponding side of the drop-plate.

The cover 13 of the dome 12 is equipped with a bait-suspension spring 37, to which may be attached a cord 38, having a bait 39 of any suitable character, and it is evident that this cover may be removed from the dome in order to easily place the bait-suspending cord over said spring. The cover can be replaced in order to suspend a large-size bait over the drop-plate 24, and this bait serves to entice the animal upon the drop-plate. The imposition of a slight weight on the plate 24 depresses the latter against the tension of the spring 36, and this downward movement of the plate operates the arms 26 so as to rock the shaft 27 and make the arm 29 of said shaft withdraw the latch-rod 31 from engagement with the latch-spring 34, whereupon the platform 14 is released and the weight of the animal overcomes the inertia of the weight 17ª, whereby the platform will be turned on the pivot 15 and the animal will drop through the slot 8 into the cage 5. The removal of the weight from the platform 14 allows the drop-weight 17ª to again become effective in raising the platform to its horizontal position, and the parts are arrested by the stops 18. The spring 36 raises the drop-plate, and the rod 31 is pressed into engagement with the latch-spring 34, thus resetting the trap.

Having thus described my invention, I claim as new and desire to secure by Letters Patent—

1. An animal-trap comprising a casing, a single platform arranged longitudinally in said casing and hinged at one edge thereto, a counterweighted arm for holding the platform in a horizontal position, a cranked rock-shaft carried by the platform, a drop-plate independent of the platform, arms attached to the rock-shaft and the drop-plate to sustain the latter above the platform, and a latch controllable by the crank of the rock-shaft and releasable by the depression of the drop-plate.

2. An animal-trap comprising a casing having a removable top section and a runway leading to said top section, a hinged counterpoised platform, a rock-shaft carried by the platform, a spring-pressed drop-plate, arms attached to the drop-plate and the rock-shaft to sustain the drop-plate above the platform, a latch carried by the platform and having a cranked connection with the rock-shaft, and a spring-keeper attached to the upper section of the casing in the path of the latch.

3. An animal-trap comprising a lower cage or member, an upper member having a pivoted platform, a drop-plate, a rock-shaft mounted on the platform and having curved arms attached to the drop-plate, a spring engaging with the drop-plate, a latch-rod mounted on the platform and having a cranked connection with the rock-shaft, and a latch-spring supported on the upper member and disposed in the path of the latch-rod.

In testimony whereof I have signed my name to this specification in the presence of two subscribing witnesses.

VALENTINE WEILER.

Witnesses:
T. A. BOEHMER,
J. W. STINER.